United States Patent
Kannankeril et al.

(10) Patent No.: US 7,223,461 B2
(45) Date of Patent: *May 29, 2007

(54) HIGH STRENGTH HIGH GAS BARRIER CELLULAR CUSHIONING PRODUCT

(75) Inventors: Charles Kannankeril, North Caldwell, NJ (US); Michael Metta, Wayne, NJ (US); Robert O'Dowd, Wesley Hills, NY (US)

(73) Assignee: Sealed Air Corporation (US), Saddle Brook, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/648,113

(22) Filed: Aug. 26, 2003

(65) Prior Publication Data

US 2004/0101659 A1    May 27, 2004

Related U.S. Application Data

(63) Continuation-in-part of application No. 10/302,004, filed on Nov. 22, 2002, now Pat. No. 6,982,113.

(51) Int. Cl.
*B32B 3/00*    (2006.01)

(52) U.S. Cl. ............... 428/166; 428/178; 206/522; 206/814; 493/967

(58) Field of Classification Search ............... 428/166, 428/178, 188; 206/522, 814; 493/967
See application file for complete search history.

(56) References Cited

U.S. PATENT DOCUMENTS

| | | |
|---|---|---|
| 3,294,387 A | 12/1966 | Chavannes |
| 3,703,430 A | 11/1972 | Rich |
| 3,873,643 A | 3/1975 | Wu et al. |
| 3,954,368 A | 5/1976 | Kawakami |
| 4,076,872 A | 2/1978 | Lewicki et al. |
| 4,087,587 A | 5/1978 | Shida et al. |
| 4,096,306 A | 6/1978 | Larson |
| 4,314,865 A | 2/1982 | Ottaviano |

(Continued)

FOREIGN PATENT DOCUMENTS

EP    483665 A    10/1991

(Continued)

OTHER PUBLICATIONS

Wild et al, J. Poly. Sci. Poly. Phys. Ed., vol. 20, p. 441 (1982).

(Continued)

*Primary Examiner*—Donald J. Loney
(74) *Attorney, Agent, or Firm*—Rupert B. Hurley, Jr.

(57) ABSTRACT

An inflatable cushioning article is made from a multilayer film having a seal layer, a gas barrier layer, and a tie layer adhering the seal layer to the gas barrier layer. The cushioning article has a plurality of inflatable chambers, with each of the chambers having a plurality of cells connected in series to one another via inflation channels. Although the inflatable article can be made from relatively thin films, the article exhibits a relatively high burst pressure and can be inflated to, for example 3 psi, and withstand conditions such as 140° F. and high altitude, without film delamination, seal failure, or film rupture. Preferably, the tie layer comprises an anhydride modified polyolefin having an anhydride content of at least 150 ppm.

25 Claims, 6 Drawing Sheets

U.S. PATENT DOCUMENTS

| | | |
|---|---|---|
| 4,394,485 A | 7/1983 | Adur |
| 4,551,379 A | 11/1985 | Kerr |
| 4,576,669 A | 3/1986 | Caputo |
| 4,657,625 A | 4/1987 | Kawakami |
| 4,950,541 A | 8/1990 | Tabor et al. |
| 5,116,444 A | 5/1992 | Fox |
| 5,206,075 A | 4/1993 | Hodgson, Jr. |
| 5,241,031 A | 8/1993 | Mehta |
| 5,272,236 A | 12/1993 | Lai et al. |
| 5,278,272 A | 1/1994 | Lai et al. |
| 5,427,830 A | 6/1995 | Pharo |
| 5,503,790 A | 4/1996 | Clements |
| 5,912,070 A | 6/1999 | Miharu et al. |
| 6,410,119 B1 | 6/2002 | DeLuca et al. |
| 6,423,166 B1 * | 7/2002 | Simhaee .................. 156/156 |
| 6,682,622 B2 | 1/2004 | Matarasso |
| 6,800,162 B2 | 10/2004 | Kannankeril et al. |
| 6,982,113 B2 | 1/2006 | Kannankeril et al. |
| 2002/0166788 A1 | 11/2002 | Sperry et al. |

FOREIGN PATENT DOCUMENTS

| | | |
|---|---|---|
| EP | 1 338 413 A1 | 8/2003 |
| GB | 978654 | 12/1964 |
| JP | 10-151627 | 6/1998 |
| WO | 90/03414 | 5/1990 |
| WO | 93/03093 | 2/1993 |
| WO | 02/26644 | 4/2002 |

OTHER PUBLICATIONS

U.S. Appl. No. 10/057,067, Sperry et al, "Apparatus and Method for Forming Inflated Chambers".

U.S. Appl. No. 09/934,732, Kannankeril et al, "Integrated Process for Making Inflatable Article".

U.S. Appl. No. 10/648,015, filed Aug. 26, 2003, Kannankeril et al.

* cited by examiner

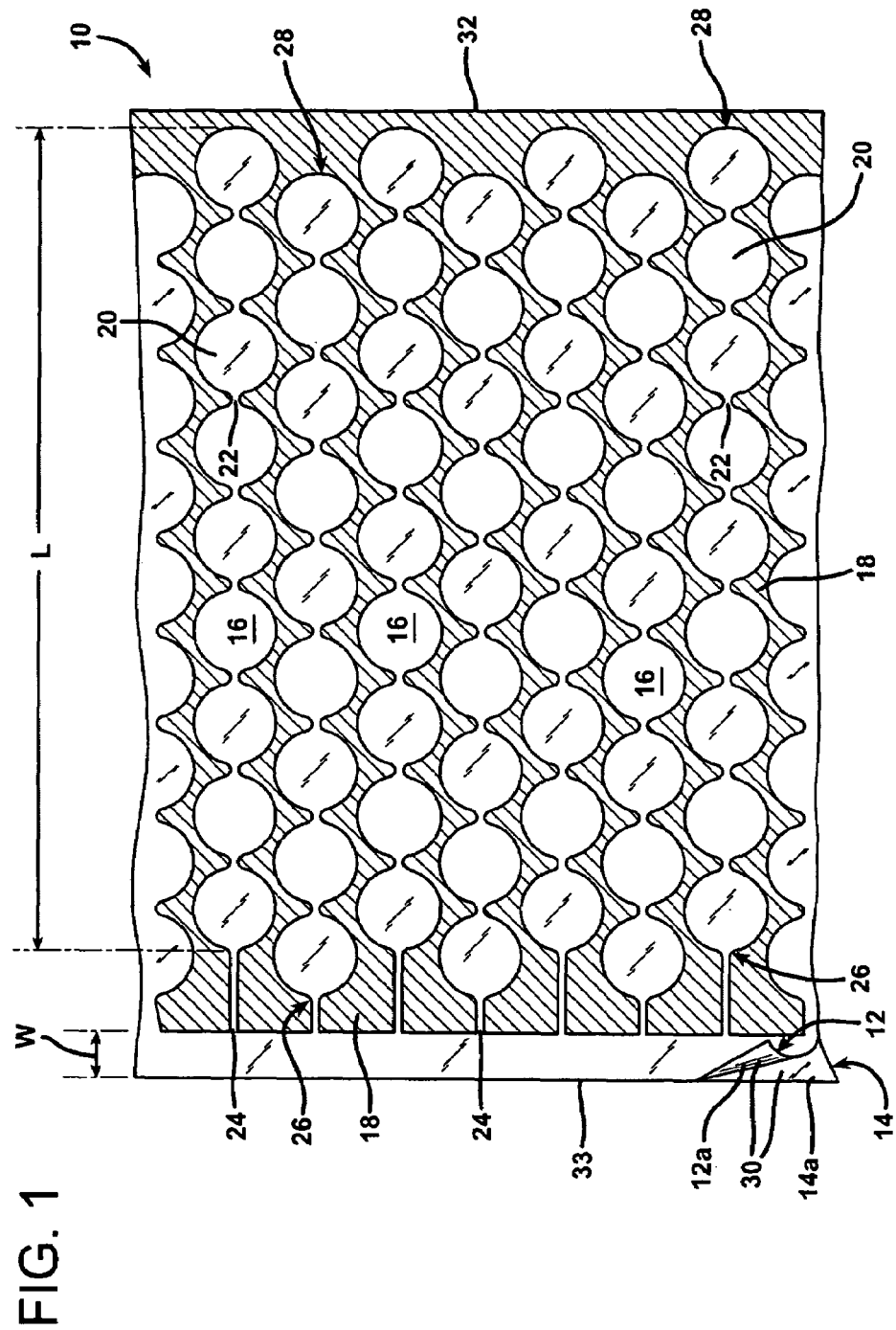

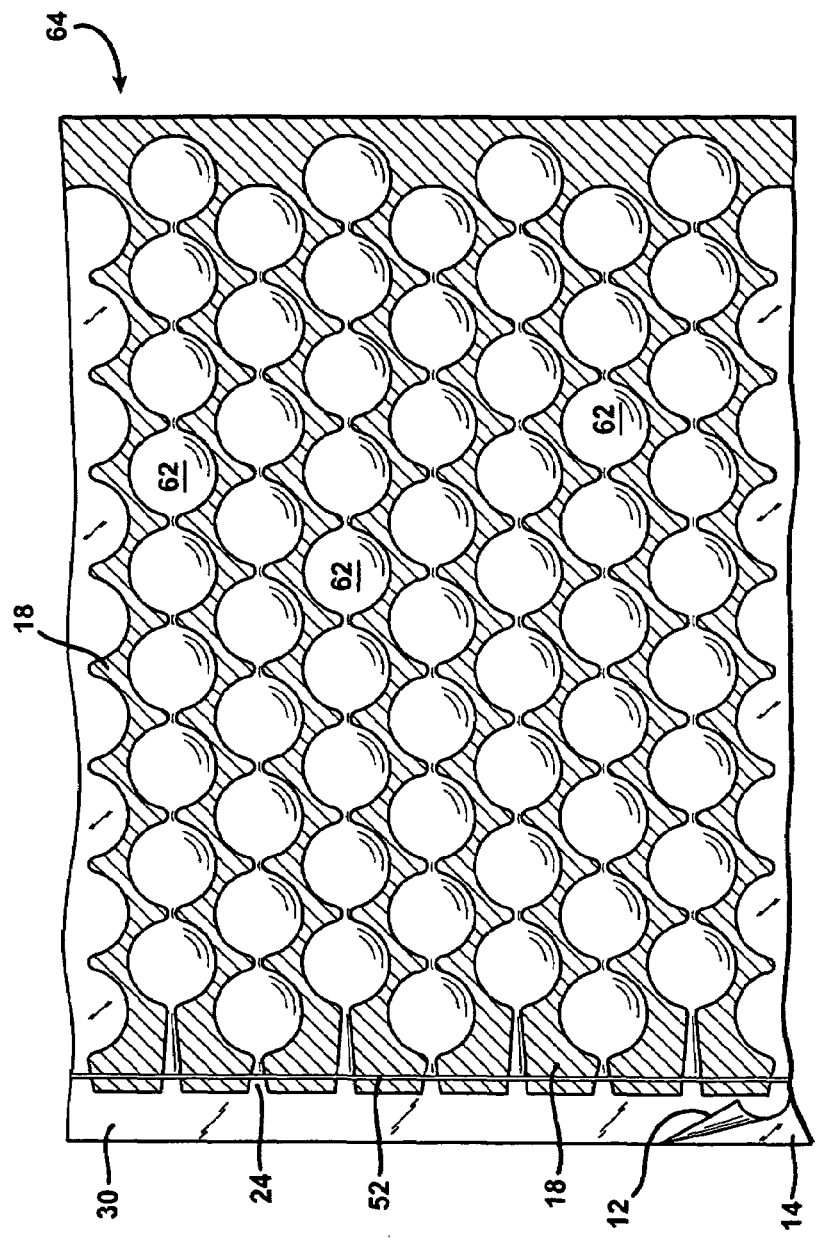

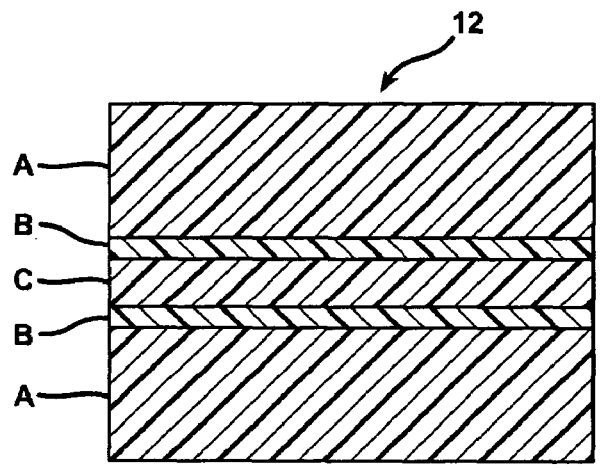
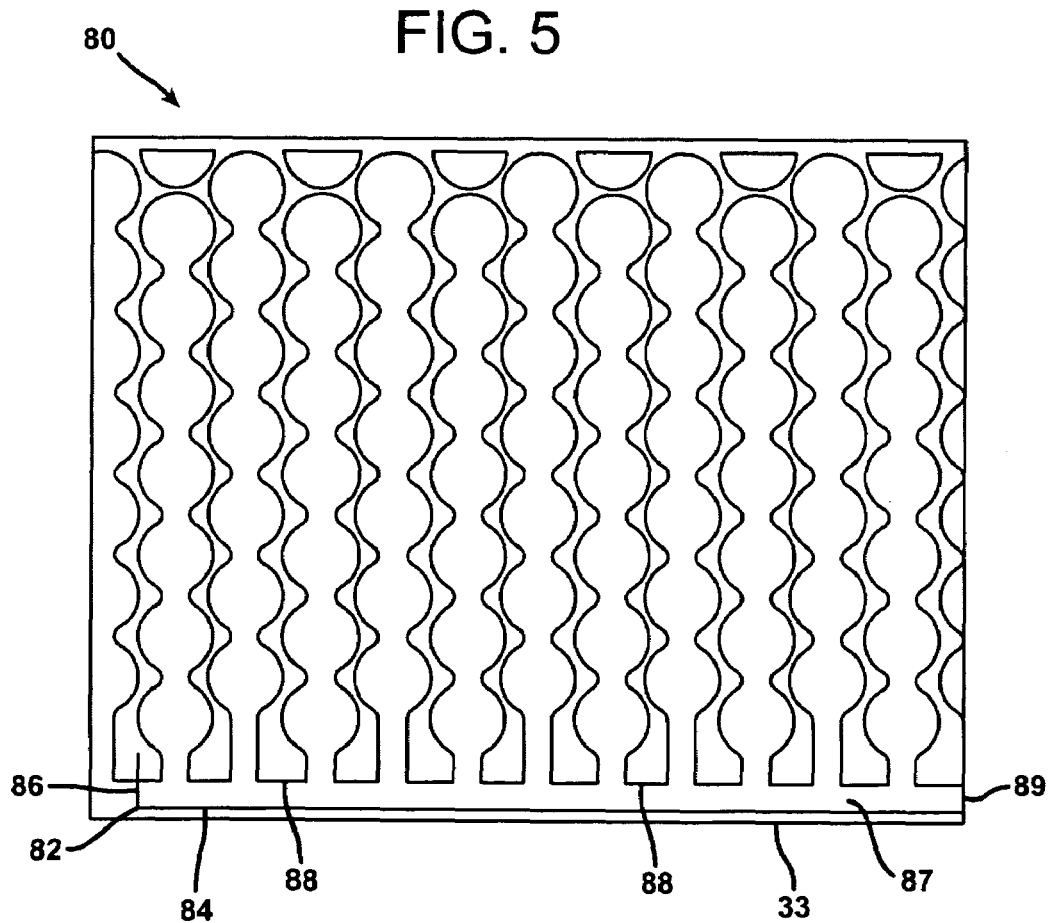

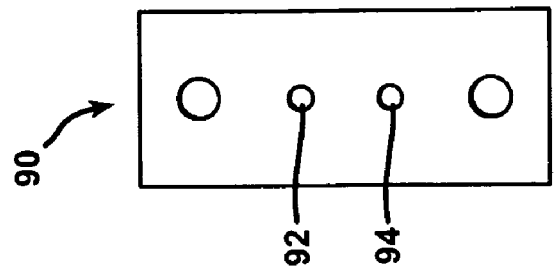
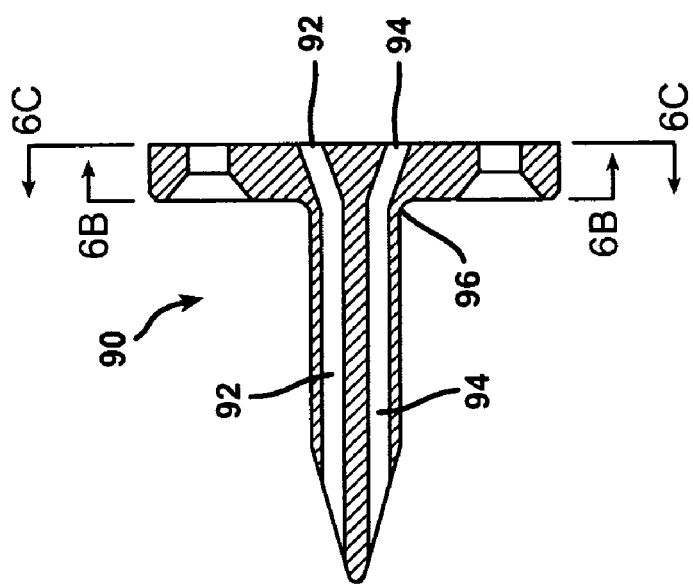
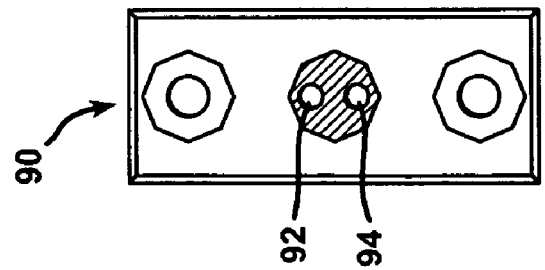

HIGH STRENGTH HIGH GAS BARRIER CELLULAR CUSHIONING PRODUCT

CROSS-REFERENCE TO RELATED APPLICATION

This application is a continuation-in-part of U.S. Ser. No. 10/302,004, now U.S. Pat. No. 6,982,113, entitled "High Strength High Gas Barrier Cellular Cushioning Product", filed Nov. 22, 2002, the entirety of which is hereby incorporated by reference thereto. To the extent that any disclosure in the '004 application may conflict with the disclosure herein, the instant specification dominates the disclosure in the '004 application.

FIELD OF THE INVENTION

The invention pertains to cellular cushioning articles, especially air cellular cushioning articles suitable for packaging end uses.

BACKGROUND OF THE INVENTION

Air cellular cushioning articles suitable for packaging applications have been in commercial use for several decades. One of the products in widespread use is Bubble-Wrap® cellular cushioning, one embodiment of which is made by using heat and vacuum to form spaced-apart, air-filled cavities in a first film and thereafter heat sealing a flat second "backing" film to the flats between the cavities of the first film, so that air is entrapped in the formed cavities making up the individualized cells. The resulting air-cellular cushioning product comprises discrete closed bubbles. If any one bubble bursts, no other bubble necessarily deflates. One significant disadvantage of BubbleWrap® cellular cushioning product is that shipping costs are high per unit weight of product because the product density is low, i.e., the shipping of such products is mostly shipping air.

Bubble Wrap® cellular cushioning has been made from multilayer films having outer seal layers, a central gas barrier layer, and a tie layer between each of the seal layers and the barrier layer. The tie layer has been made from an anhydride modified low density polyethylene, with an anhydride content of about 141 parts per million, based on the weight of the anhydride modified low density polyethylene in the tie layer.

Although Bubble Wrap® cushioning products have not been displaced by inflatable flexible cushioning articles, in the past there have been a number of commercialized air-cellular cushioning products for packaging which have been designed to be inflated by the end user, i.e., inflated and sealed shut immediately before end use by the packager. These products offer the advantage of being shippable before inflation, providing for much more efficient transport and storage before use, as any given volume within a truck or warehouse can hold over thirty times as much product if it is uninflated rather than shipped to the packager while inflated. One of these products has been made from the same multilayer film used for Bubble Wrap® cellular cushioning.

These "inflatable" cellular packaging products differ from BubbleWrap® cellular cushioning in a number of ways. One notable difference between inflatable cushioning products and BubbleWrap® cellular cushioning is that the inflatable cushioning articles have a plurality of chambers extending from a fill zone, with each of the chambers containing a series of interconnected inflatable bubbles (i.e., "cells"), with each series of bubbles extending transversely across the web. Air within one of the cells of a particular series can freely move within other cells of the same series. More particularly, if a load is placed on one of the bubbles in the series, the bubble can partially or fully collapse as air is displaced from within the bubble, with the air moving to the other bubbles in the series. The displacement of air from one bubble to others can be detrimental to a packaged product because the product may no longer be receiving adequate cushioning protection. It would be desirable to reduce or eliminate this "bottoming out" tendency in an inflatable air cellular product.

SUMMARY OF THE INVENTION

The present invention pertains to an inflatable flexible cellular cushioning article made from films which are sealed together in a pattern which provides a plurality of inflatable chambers, with each chamber having a plurality of inflatable cells connected to one another in series. The films which are sealed together are relatively thin, flexible, multilayer films having a gas barrier layer, a seal layer, and a tie layer adhering the gas barrier layer to the seal layer.

Although an inflatable cushioning article made from the same films used for Bubble Wrap® cellular cushioning performed well when inflated to the normal pressure of 1 psi, when the internal pressure was elevated to a higher-than-normal 3 psi, it was discovered that this inflated article performed satisfactorily under many conditions of use, but did not perform satisfactorily when subjected to somewhat harsh conditions of use, such as in a 140° F. environment for several hours. That is, when used under such harsh conditions, it was discovered that the multilayer film delaminated due to adhesive and/or cohesive failure of the tie layers. However, the higher-than-normal 3 psi internal pressure provides the inflatable article with a reduced tendency of any one cell to "bottom out" when subjected to load.

It has been discovered that the multilayer film can be provided with a tie layer strong enough to allow the multilayer barrier film to be used in a 3 psi inflated cellular cushioning article without delamination under harsh conditions of use. The substitution of the stronger tie layer in place of the weaker tie layer previously used has been found to reduce or eliminate film delamination when the article is subjected to harsh conditions, such as high temperature (e.g., 140° F.), low external pressure (e.g., 13.7 inches of mercury vacuum). For example, it has been discovered that by making the tie layers from a maleic anhydride modified linear low density polyethylene having a maleic anhydride content of about 190 parts per million (versus the maleic anhydride modified low density polyethylene having a maleic anhydride content of 141 parts per million previously used), the inflatable article is capable of withstanding the higher-than-normal 3 psi internal pressure without delamination, even when subjected to harsh conditions, such as 140° F. for four hours. Moreover, the inflatable article made using this film was also found to provide the article with the capability of withstanding the 3 psi internal pressure in combination with low ambient pressure as can be found on mountain tops and in airplane cargo compartments, without film delamination, seal failure, or film bursting.

As a first aspect, the present invention is directed to an inflatable cellular cushioning article having a plurality of inflatable chambers with each chamber comprising a plurality of inflatable cells connected in series with one another. The inflatable cells having a maximum lay flat (uninflated) dimension of from 1 to 3 inches (preferably, from 1 to 2.5 inches, more preferably, from 1.5 to 2 inches). The article is made from a first multilayer film having a unit weight of from 20 to 70 grams per square meter sealed to itself or a second multilayer film having a unit weight of from 20 to 70 grams per square meter. The first and second films each comprise an outer seal layer, a gas barrier layer, and a tie layer between the seal layer and the gas barrier layer. The article is capable of withstanding an internal inflation pressure of at least 1.5 psi (preferably from 1.5 to 10 psi, more preferably from 1.5 to 5 psi, more preferably 2 to 4 psi, more preferably from 2 to 3.5 psi, more preferably about 3 psi) measured at 23° C. and 1 atmosphere ambient pressure, for a period of 4 hours at a temperature of 140° F., without film failure, seal failure, or delamination of film layers from one another.

Preferably, the gas barrier layer of the first and second films comprises at least one member selected from the group consisting of crystalline polyamide, crystalline polyester, hydrolyzed ethylene/vinyl acetate copolymer, etc., as discussed in detail below.

Preferably, the tie layer comprises an anhydride modified polyolefin, more preferably anhydride modified ethylene/ $C_{4-10}$ alpha-olefin copolymer ($C_{4-10}$=$C_4$ to $C_{10}$=$C_4$, $C_5$, $C_6$, $C_7$, $C_8$, $C_9$, and/or $C_{10}$); more preferably, the anhydride modified polyolefin comprises anhydride modified linear low density polyethylene having an anhydride content of at least 180 ppm as determined by pyrolysis GCMS. Preferably, the seal layer of the first and second films comprises at least one member selected from the group consisting homogeneous ethylene/alpha-olefin copolymer, more preferably very low density polyethylene, low density polyethylene, and/or linear low density polyethylene.

Preferably, the first film has first and second outer layers, a central gas barrier layer, a first tie layer between the first outer layer and the gas barrier layer, and a second tie layer between the gas barrier layer and the second outer layer. Preferably, the first and second outer layers of the first film have the same layer thickness and have the same polymeric composition, and the first and second tie layers of the first film have the same layer thickness and the same polymeric composition. Preferably, the first film is identical to the second film with regard to the number of film layers and/or the composition of each layer of the film and/or the arrangement of the various film layers and/or the thickness of the various film layers and/or the overall film thickness.

Although the article can comprise a single film which is folded over and sealed to itself, preferably the article comprises a first film heat sealed to a second film. Preferably, the first film has first and second outer layers, a central gas barrier layer, a first tie layer between the first outer layer and the gas barrier layer, and a second tie layer between the gas barrier layer and the second outer layer. Preferably, the second film has an first and second outer layers, a central gas barrier layer, a first tie layer between the first outer layer and the gas barrier layer, and a second tie layer between the gas barrier layer and the second outer layer. Preferably, the first and second outer layers of the first film have the same layer thickness and have the same polymeric composition, and the first and second tie layers of the first film have the same layer thickness and the same polymeric composition. Preferably, the first and second outer layers of the second film have the same layer thickness and have the same polymeric composition, and the first and second tie layers of the second film have the same layer thickness and the same polymeric composition. Preferably, the first and second films each have a total thickness of from 0.5 mil to 3 mils; more preferably, from 0.8 mil to 2.5 mils; more preferably, from 1 mil to 2 mils; more preferably, from 1.2 to 1.8 mils, and more preferably, about 1.6 mils.

In one preferred embodiment, the chambers extend transversely from a closed inflation manifold which extends along a machine direction. In another preferred embodiment, the chambers extend transversely from an open skirt which extends along a machine direction. Preferably, each chamber comprises from 3 to 40 cells, more preferably from 3 to 20 cells, more preferably from 4 to 18 cells, more preferably, from 4 to 16 cells, more preferably from 4 to 10 cells, and more preferably, from 4 to 7 cells.

In a "small cell" embodiment, preferably the inflatable cells have a maximum dimension (i.e., a major axis or major dimension, which is the maximum dimension when in an uninflated, lay-flat condition) having a length of from 0.3 inch to 3 inches, more preferably 0.5 to 3 inches, more preferably from 0.7 to 2.5 inches, more preferably from 1 to 2.5 inches, more preferably, from 1.5 to 2 inches, and more preferably, about 1.75 inches. Preferably, cells in adjacent chambers are nested with respect to one another. Although the cells are not restricted with respect to shape, preferably the cells have an overall circular when viewed uninflated in lay-flat condition.

In another preferred embodiment, the connecting channels are formed from a seal shape having straight, parallel edges which intersect with the seal edges which define the cells. The intersection of the straight seal edges of the connecting channel with the seal edges of the cells provides a sharp bends, i.e., corners, which are capable of concentrating stresses upon inflation. See the Second Example, below. It has been found that providing a stronger tie layer allows for the presence of sharp bends in the seal pattern, without the ensuing concentrated stresses upon inflation causing film rupture, film seal failure, or layer delamination.

As a second aspect, the present invention pertains to an inflatable cellular cushioning article having a plurality of inflatable chambers with each chamber comprising a plurality of inflatable cells connected in series. According to this second aspect, the inflatable article is of a "large cell" variety, with the cells preferably having a maximum dimension of from 3 to 6 inches, more preferably from 3 to 5 inches, more preferably from 3 to 4.5 inches. The article being made from a first multilayer film having a unit weight of from 60 to 250 grams per square meter (preferably from 60 to 250, more preferably from 70 to 200, more preferably from 80 to 180, more preferably from 100 to 150 grams per square meter) sealed to itself or a second multilayer film having a unit weight of from 60 to 250 grams per square meter (preferably from 60 to 250, more preferably from 70 to 200, more preferably from 80 to 180, more preferably from 100 to 150 grams per square meter). The first and second films each comprise an outer seal layer, a gas barrier layer, and a tie layer between the seal layer and the gas barrier layer. The article is capable of withstanding an internal inflation pressure of 1.5 psi (preferably 2 psi, more preferably 2.5 psi, more preferably 3 psi), measured at 23° C. and 1 atmosphere ambient pressure, for a period of 4 hours at a temperature of 140° F., without film failure, seal failure, or delamination of film layers from one another.

As a third aspect, the present invention is directed to an inflatable cellular cushioning article having a plurality of inflatable chambers with each chamber comprising a plurality of inflatable cells connected in series with one another. The article is made from a first multilayer film having a unit weight of from 20 to 250 grams per square meter sealed to itself or a second film having a unit weight of from 20 to 250 grams per square meter. The first and second films each comprise an outer seal layer, a gas barrier layer, and a tie layer between the seal layer and the gas barrier layer. The tie layer comprises an anhydride modified olefin polymer containing anhydride at a level of at least 150 ppm, based on the weight of the modified olefin polymer.

As a fourth aspect, the present invention is directed to an inflatable cellular cushioning article having a plurality of inflatable chambers with each chamber comprising a plurality of inflatable cells connected in series with one another. The inflatable cells have a maximum lay flat dimension of from 1 to 3 inches. This article comprises a first multilayer film having a unit weight of from 20 to 70 grams per square meter sealed to itself or a second multilayer film having a unit weight of from 20 to 70 grams per square meter. The first and second films each comprise an outer seal layer, a gas barrier layer, and a tie layer between the seal layer and the gas barrier layer. The article exhibits a failure pressure of at least 7 psi (preferably, at least 7.5 psi, more preferably, at least 8 psi, more preferably, at least 8.5 psi, more preferably, at least 9 psi).

As a fifth aspect, the present invention is directed to an inflatable cellular cushioning article having a plurality of inflatable chambers with each chamber comprising a plurality of inflatable cells connected in series with one another, the inflatable cells having a maximum lay flat dimension of from 3 inches to 6 inches. The article is made from a first multilayer film having a unit weight of from 60 to 250 grams per square meter, sealed to itself or a second multilayer film having a unit weight of from 60 to 250 grams per square meter. The first and second films each comprise an outer seal layer, a gas barrier layer, and a tie layer between the seal layer and the gas barrier layer. The article exhibits a failure pressure of at least 7 psi (preferably at least 7.5 psi, more preferably at least 8 psi, more preferably at least 8.5 psi, more preferably at least 9 psi).

As a sixth aspect, the invention is directed to an inflatable cellular cushioning article having a plurality of inflatable chambers with each chamber comprising a plurality of inflatable cells connected in series with one another, the inflatable cells having a maximum dimension of from 1 to 3 inches. The article comprises a first multilayer film having a unit weight of from 20 to 70 grams per square meter sealed to itself or a second multilayer film having a unit weight of from 20 to 70 grams per square meter. The first and second films each comprise an outer seal layer, a gas barrier layer, and a tie layer between the seal layer and the gas barrier layer. The article is capable of withstanding inflation to an internal pressure of 1.5 psi (preferably 2 psi, more preferably 2.5 psi, more preferably 3 psi) measured at 23° C. and 1 atmosphere ambient pressure with the resulting inflated article then being subjected to a reduced ambient pressure of 0.542 atmosphere (i.e., 0.458 atm vacuum=13.7 inches of mercury vacuum=348 mm mercury vacuum) for a period of 5 minutes at a temperature of 23° C., without film failure, seal failure, or delamination of film layers from one another.

As a seventh aspect, the present invention is directed to an inflatable cellular cushioning article having a plurality of inflatable chambers with each chamber comprising a plurality of inflatable cells connected in series with one another, the inflatable cells having a maximum dimension of from 3 inches to 6 inches. The article is made from a first multilayer film having a unit weight of from 60 to 250 grams per square meter sealed to itself or a second multilayer film having a unit weight of from 60 to 250 grams per square meter. The first and second films each comprise an outer seal layer, a gas barrier layer, and a tie layer between the seal layer and the gas barrier layer. The article is capable of withstanding inflation to an internal pressure of 1.5 psi (preferably 2 psi, more preferably 2.5 psi, more preferably 3 psi) measured at 23° C. and 1 atmosphere ambient pressure, with the resulting inflated article being subjected to a reduced ambient pressure of 0.542 atmosphere for a period of 5 minutes at a temperature of 23° C., without film failure, seal failure, or delamination of film layers from one another.

As a eighth aspect, the present invention pertains to an inflatable cellular cushioning article having a plurality of inflatable chambers with each chamber comprising a plurality of inflatable cells connected in series with one another, the inflatable cells having a maximum dimension of from 1 to 3 inches. The article is made from a first multilayer film having a unit weight of from 20 to 70 grams per square meter sealed to itself or a second multilayer film having a unit weight of from 20 to 70 grams per square meter. The first and second films are multilayer films each having a seal layer, a gas barrier layer, and a tie layer between the seal layer and the gas barrier layer. The article is capable of withstanding inflation to an internal pressure of 1.5 psi (preferably 2 psi, more preferably 2.5 psi, more preferably 3 psi) measured at 23° C. and 1 atmosphere ambient pressure with the resulting inflated article being subjected a load of 0.1 psi for a period of 7 days at a temperature of 140° F., without film failure, seal failure, or delamination of film layers from one another.

As a ninth aspect, the present invention is directed to an inflatable cellular cushioning article having a plurality of inflatable chambers with each chamber comprising a plurality of inflatable cells connected in series with one another. The inflatable cells have a maximum dimension of from 3 inches to 6 inches. The article is made from a first multilayer film having a unit weight of from 60 to 250 grams per square meter sealed to itself or a second multilayer film having a unit weight of from 60 to 250 grams per square meter. The first and second films are multilayer films each having a seal layer, a gas barrier layer, and a tie layer between the seal layer and the gas barrier layer. The article is capable of withstanding inflation to an internal pressure of 1.5 psi (preferably 2 psi, more preferably 2.5 psi, more preferably 3 psi) measured at 23° C. and 1 atmosphere ambient pressure with the resulting inflated article being subjected a load of 0.1 psi for a period of 7 days at a temperature of 140° F., without film failure, seal failure, or delamination of film layers from one another.

As a tenth aspect, the present invention is directed to an inflated cushioning article having a plurality of inflated chambers with each chamber comprising a plurality of inflated cells connected in series with one another. The inflated cells have a maximum preinflation lay flat dimension of from 1 to 3 inches. The article is made from a first multilayer film having a unit weight of from 20 top 70 grams per square meter sealed to itself or a second multilayer film having a unit weight of from 20 to 70 grams per square meter. The first and second films are multilayer films each having a seal layer, a gas barrier layer, and a tie layer between the seal layer and the gas barrier layer. The inflated cells have an internal pressure of from 1.5 to 9 psi (preferably, from 2 to 7 psi, more preferably from 2 to 5 psi, more preferably from 2 to 4 psi, more preferably from 2.5 to 3.5 psi).

As an eleventh aspect, the present invention is directed to an inflated cushioning article having a plurality of inflated chambers with each chamber comprising a plurality of inflated cells connected in series with one another. The inflated cells have a maximum preinflation lay flat dimension of from 3 to 6 inches. The article is made from a first multilayer film having a unit weight of from 60 to 250 grams per square meter sealed to itself or a second multilayer film having a unit weight of from 60 to 250 grams per square meter. The first and second films are multilayer films each having a seal layer, a gas barrier layer, and a tie layer between the seal layer and the gas barrier layer. The inflated cells have an internal pressure of from 1.5 to 9 psi (preferably, from 2 to 7 psi, more preferably from 2 to 5 psi, more preferably from 2 to 4 psi, more preferably from 2.5 to 3.5 psi).

Finally, the invention also pertains to a process for making an inflatable cellular cushioning article. The process comprises extruding first and second multilayer films in accordance with the article of the invention, followed by heat sealing the films to one another so that a plurality of inflatable chambers are formed, followed by inflating the article. Preferably, the multilayer films each comprise a gas barrier layer which contains a polymer which crystallizes upon being aged (e.g., aging for 8 days at room temperature), which increases the burst strength (i.e., failure pressure) of the resulting inflatable article. In place of extruding two separate multilayer films, a single multilayer film can be extruded in annular form followed by being slit open (preferably, along one lay-flat edge crease) or extruded through a slot die followed by being folded lengthwise (e.g., centerfolded) and sealed to itself to form the inflatable article. Optionally, the centerfolded film can be slit two provide the two multilayer films.

Unless inapplicable thereto or inconsistent therewith, the above-described preferred features for each of the above aspects of the invention apply to all of the other above-describe aspects of the invention.

BRIEF DESCRIPTION OF THE DRAWINGS

FIG. 1 is a lay-flat view of a preferred inflatable article in accordance with the present invention.

FIG. 2 is a perspective view of the article of FIG. 1 after inflation.

FIG. 3 is an enlarged cross-sectional schematic view of a preferred multilayer film for use in the inflatable article of the present invention.

FIG. 5 is a lay-flat view of a section of inflatable article which has been modified for conducting a burst test.

FIG. 6A is a longitudinal sectional view of an inflation nozzle to be used in the burst test.

FIG. 6B is a cross-sectional view of the inflation nozzle of FIG. 6A, taken through line 6B—6B of FIG. 6A.

FIG. 6C is a cross-sectional view of the inflation nozzle of FIG. 6A, taken through line 6C—6C of FIG. 6A.

DETAILED DESCRIPTION OF THE INVENTION

Figure 4:
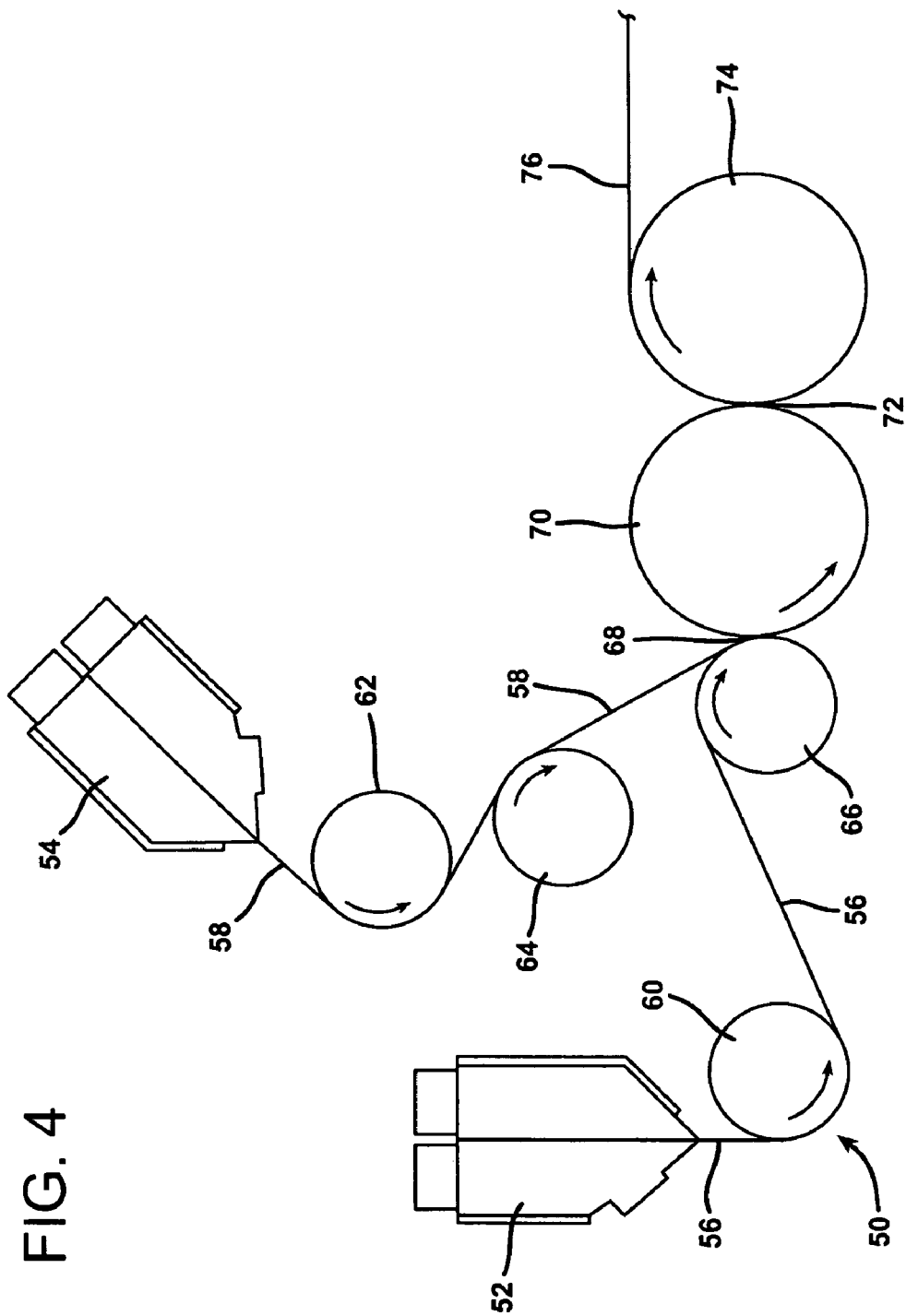
FIG. 4 is a schematic of a preferred process for making the inflatable article.

As used herein, the term "film" is used in a generic sense to include plastic web, regardless of whether it is film or sheet. Preferably, films of and used in the present invention have a thickness of 0.25 mm or less.

As used herein, the term "seal" refers to any seal of a first region of a film surface to a second region of a film surface, wherein the seal is formed by heating the regions to at least their respective seal initiation temperatures. The sealing can be performed by any one or more of a wide variety of manners, preferably sealing is carried out by contacting the films with a heated drum to produce a heat seal, as described below. The term "seal", as used herein, is also inclusive of a film adhered to itself with an adhesive, or films adhered to one another with an adhesive. However, the various layers of a multilayer coextruded film are not considered to be "sealed" to one another because the term "seal", as used herein, refers to adhering less than the entire film surfaces to one another, i.e., leaving an unsealed region.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith. As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer.

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith. Preferably, such modified polymers have the anhydride functionality grafted on or polymerized therewith, as opposed to merely blended therewith.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more processes known to those of skill in the art, such as molecular weight distribution (Mw/Mn), Mz/Mn, composition distribution breadth index (CDBI), and narrow melting point range and single melt point behavior. The molecular weight distribution (Mw/Mn), also known as polydispersity, may be determined by gel permeation chromatography. The homogeneous ethylene/alpha-olefin copolymers useful in this invention generally has (Mw/Mn) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et. al., J. Poly. Sci. Poly. Phys. Ed., Vol. 20, p.441 (1982). Preferably, homogeneous ethylene/alpha-olefin copolymers have a CDBI greater than about 70%, i.e., a CDBI of from about 70% to 99%. In general, the homogeneous ethylene/alpha-olefin copolymers in the patch bag of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point (Tm), as determined by Differential Scanning Calorimetry (DSC), of from about 60° C. to 110° C. Preferably the homogeneous copolymer has a DSC peak Tm of from about 80° C. to 100° C. As used herein, the phrase "essentially single melting point" means that at least about 80%, by weight, of the material corresponds to a single Tm peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties. Each of these patents disclose substantially linear homogeneous long chain branched ethylene/alpha-olefin copolymers produced and marketed by The Dow Chemical Company.

As used herein, the phrase "ethylene/alpha-olefin copolymer", and "ethylene/alpha-olefin copolymer", refer to such materials as linear low density polyethylene (LLDPE), and very low and ultra low density polyethylene (VLDPE and ULDPE); and homogeneous polymers such as metallocene catalyzed polymers such as EXACT® resins obtainable from the Exxon Chemical Company, and TAFMER® resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefins commonly known as LLDPE have a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene/alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrase "very low density polyethylene" refers to heterogeneous ethylene/alpha-olefin copolymers having a density of 0.915 g/cc and below, preferably from about 0.88 to 0.915 g/cc. As used herein, the phrase "linear low density polyethylene" refers to, and is inclusive of, both heterogeneous and homogeneous ethylene/alpha-olefin copolymers having a density of at least 0.915 g/cc, preferably from 0.916 to 0.94 g/cc.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer of a multilayer film which is closest to the gas in the chambers after inflation, relative to the other layers of the multilayer film. The "inside surface" of the film is the surface in contact with the gas in the chambers after inflation.

As used herein, the phrase "outside layer" refers to the outer layer of a multilayer film which is furthest to the gas in the chambers after inflation, relative to the other layers of the multilayer film. The "outside surface" of the film is the surface of the film which is the furthest from the gas in the chambers after inflation.

As used herein, the term "adhered" is inclusive of films which are directly adhered to one another using a heat seal or other means, as well as films which are adhered to one another using an adhesive which is between the two films.

As used herein, the phrase "failure pressure" refers to that pressure at which the inflatable article "fails" when inflated in accordance with the Burst Pressure Test described with the examples below. The article "fails" if either film bursts, or exhibits seal failure or delamination which is immediately apparent to the unaided eye (i.e., not including trace seal failure or trace delamination). The failure pressure is determined by inflating the article while the article is in an environment of 1 atmosphere ambient pressure and 23° C. ambient temperature.

Referring to FIG. 1, there is shown an inflatable article 10 in accordance with the present invention, comprising two films 12 and 14 having respective inner surfaces 12a and 14a sealed to each other in a pattern defining a series of inflatable chambers 16 of predetermined length "L." Length L may be substantially the same for each of the chambers 16, with adjacent chambers being off-set from one another as shown in order to arrange the chambers in close proximity to one another. Films 12 and 14 are sealed to each other in a pattern of seals 18, leaving unsealed areas which define the inflatable chambers 16 such that each of the chambers has at least one change in width over their length L. That is, seals 18 may be patterned to provide in each chamber 16 a series of sections 20 of relatively large width in fluid communication with the other cells of the chamber via relatively narrow passageways 22. When inflated, sections 20 may provide essentially spherical bubbles in inflatable article 10 by symmetrical outward movement of those sections of films 12 and 14 comprising the walls of sections 20. This will generally occur when films 12 and 14 are identical in thickness, flexibility, and elasticity. Films 12 and 14 may, however, be of different thickness, flexibility or elasticity such that inflation will result in different displacement of films 12 and 14, thereby providing hemispherical or asymmetrical bubbles.

Seals 18 are also patterned to provide inflation ports 24, which are located at proximal end 26 of each of the inflatable chambers 16 in order to provide access to each chamber so that the chambers may be inflated. Opposite to proximal end 26 of each chamber is closed distal end 28. As shown, seals 18 at proximal end 26 are intermittent, with inflation ports 24 being formed therebetween. Preferably, inflation ports 24 are narrower in width than inflatable sections 20 of relatively large width, in order to minimize the size of the seal required to close off each chamber 16 after inflation thereof.

Inflatable article 10 further includes a pair of longitudinal flanges 30, which are formed by a portion of each of films 12 and 14 that extend beyond inflation ports 24 and intermittent seals 18. In the embodiment shown in FIG. 1, flanges 30 extend out equally beyond ports 24 and seals 18. The flanges accordingly have equivalent widths, shown as width "W." Flanges 30, in conjunction with ports 24 and seals 18, constitute an open inflation zone in inflatable article 10 that is advantageously configured to provide rapid and reliable inflation of chambers 16. The inner surfaces of flanges 30 can be brought into close slidable contact with outwardly facing surfaces of an appropriately configured nozzle or other inflation means so as to provide a partially closed inflation zone which promotes efficient and reliable sequential inflation of chambers 16 without restricting the movement of the web or inflation nozzle that is required to effect this sequential inflation. Flanges 30 are preferably at least ¼ inch in width and, more preferably, at least ½ inch in width. The flanges may have different widths, but it is generally preferred that they are equal in width, as shown in FIG. 1. A preferred apparatus and method for effecting inflation and sealing of the chambers is disclosed in U.S. Ser. No. 10/057,067, to Sperry et. al., entitled "APPARATUS AND METHOD FOR FORMING INFLATED CHAMBERS", which is hereby incorporated, in its entirety, by reference thereto.

Preferably, the seal pattern of seals 18 provides uninflatable planar regions between chambers 16. These planar regions serve as flexible junctions that may advantageously be used to bend or conform the inflated article about a product in order to provide optimal cushioning protection. In another embodiment, the seal pattern can comprise relatively narrow seals that do not provide planar regions. These seals serve as the common boundary between adjacent chambers. Such a seal pattern is shown for example in U.S. Pat. No. 4,551,379, the disclosure of which is incorporated herein by reference. The seals 18 may be heat seals between the inner surfaces of the films 12 and 14. Alternatively, films 12 and 14 may be adhesively bonded to each other. Heat seals are preferred and, for brevity, the term "heat seal" is generally used hereinafter. This term should be understood, however, to include the formation of seals 18 by adhesion of films 12 and 14 as well as by heat sealing. Multilayer films 12 and 14 comprise a thermoplastic heat sealable polymer on their inner surface such that, after superposition of films 12 and 14, inflatable article 10 can be formed by passing the superposed sheets over a sealing roller having heated raised land areas that correspond in shape to the desired pattern of seals 18. The sealing roller applies heat and forms seals 18 between films 12 and 14 in the desired pattern, and thereby also forms chambers 16 with a desired shape. The sealing pattern on the sealing roller also provides intermittent seals at proximal end 26, thus forming inflation ports 24 and also effectively resulting in the formation of flanges 30. Further details concerning methods making inflatable article 10 are disclosed below and are also set forth in commonly-assigned, copending patent application Ser. No. 09/934,732 entitled INTEGRATED PROCESS FOR MAKING INFLATABLE ARTICLE (Kannankeril et al.), filed on Aug. 22, 2001, the entire disclosure of which is hereby incorporated herein by reference, as well as copending patent application Ser. No. PCT/US02/26644 entitled PROCESS FOR MAKING INFLATABLE ARTICLE (Kannankeril et al.), filed on Aug. 22, 2002, the entire disclosure of which is also hereby incorporated herein by reference.

The heat sealability of films 12 and 14 is provided by providing films 12 and 14 as multilayer films, each contacting the other with an outer film layer comprising a heat sealable polymer. In this manner inflation ports 24 are closed by heat sealing means after inflation of a corresponding chamber.

Films 12 and 14 are initially separate films that are brought into superposition and sealed, or they may be formed by folding a single sheet onto itself with the heat sealable surface facing inward. The longitudinal edge opposite from flanges 30, shown as edge 32 in FIG. 1, is closed. Closed edge 32 may be formed in the article as a result of folding a single sheet to form sheets 12 and 14, whereby the fold constitutes edge 32, or by sealing separate films 12 and 14 in the vicinity of the longitudinal edge as part of the pattern of seals 18. Although this edge is shown as closed in FIG. 1, in other embodiments of the article of this invention this edge may be open and comprise a pair of flanges similar to flanges 30 to provide a second open inflation zone for inflating a second series of inflatable chambers or for inflation of the chambers from both ends. Optionally, the unsealed portion could further include a passageway in the machine direction which serves as a manifold, i.e. connecting each of the passageways along an edge of the article. This can permit faster inflation of the article.

The films used to make the inflatable cellular cushioning article of the present invention are multilayer films having a seal layer, a gas barrier layer, and a tie layer between the seal layer and the gas barrier layer. The seal layers can comprise any heat sealable polymer, including polyolefin, polyamide, polyester, and polyvinyl chloride, and ionomer resin. Preferably, the seal layers contain a polymer having a major DSC peak of less than 105° C., or an ethylene/vinyl acetate copolymer having a melt point below 80° C. Preferred polymers for use in the seal layers include olefin homopolymers and copolymers, particularly ethylene/alpha-olefin copolymer, particularly homogeneous ethylene/alpha-olefin copolymer, linear homogeneous ethylene/alpha-olefin copolymer, homogeneous ethylene/alpha-olefin copolymer having long chain branching, and ionomer resin. Particularly preferred sealant polymers include homogeneous ethylene/alpha-olefin copolymer such as a long chain branched homogeneous ethylene/alpha-olefin copolymer, e.g., AFFINITY® substantially linear homogeneous ethylene/alpha-olefin copolymer manufactured by The Dow Chemical Company, or EXACT® linear homogeneous product manufactured by the Exxon Chemical Company. Ethylene/hexene and ethylene/octene copolymers are particularly preferred.

Although the inflatable article is made by sealing two outer film layers to one another, if the film cross-section is symmetrical with respect to layer composition, as is preferred, both outer layers are herein referred to as "seal layers", even though only one of the layers is not heat sealed to the other film making up the inflatable article. Because the seal layers make up the majority of the overall film weight, the seal layers are present for more purposes than just sealing. The seal layers provide much of the strength, bulk, abuse, abrasion, and impact strength properties for the inflatable article. Preferably the cross section of the multilayer film is symmetrical with respect to layer arrangement, layer thickness, and layer composition.

The gas barrier layer provides the multilayer film with the property of being relatively impervious to atmospheric gases. This provides the inflated cushioning product with a longer life, as the gas barrier layer allows the inflated cushioning article to retain gas in the cells for a longer period of time. This is important because without a gas barrier layer, the cushioning product under load can exhibit substantial loss of fluid, i.e., "creep", in four to seven days, as discussed in detail below. Suitable resins for use in the gas barrier layer include crystalline polyamide, crystalline polyester, ethylene/vinyl alcohol copolymer, polyacrylonitrile, and crystalline polycycloolefin. The crystalline polymer in the gas barrier layer includes crystalline polyamides, such as polyamide 6, polyamide 66, polyamide 9, polyamide 10, polyamide 11, polyamide 12, polyamide 69, polyamide 610, polyamide 612, and copolymers thereof. Crystalline polyesters include polyethylene terephtalate and polyethylene naphthalene, and polyalkylene carbonate. Saponified ethylene/vinyl acetate copolymer is commonly referred to as ethylene/vinyl alcohol copolymer (frequently referred to as EVOH), and is a crystalline copolymer suitable for use in the gas barrier layer. Crystalline cycloolefin polymers, can make suitable gas barrier layers. Ticona is a manufacturer of such polycycloolefins. A particularly preferred gas barrier layer is made from 100% CAPLON® B100WP polyamide 6 having a viscosity of FAV=100 (i.e., FAV=formic acid viscosity), obtained from Allied Chemical.

As used herein, the phrase "tie layer" refers to any internal layer having the primary purpose of adhering two layers to one another. A tie layer contains a polymer capable of covalent bonding to polar polymers such as polyamide and ethylene/vinyl alcohol copolymer. In the present invention, the tie layer serves to adhere the seal layer to the gas barrier layer. The tie layer can comprise any polymer having a polar group thereon (particularly a carbonyl group), or any other polymer which provides sufficient interlayer adhesion to adjacent layers which comprise polymers which do not adequately adhere to one another. Such polymers include olefin/unsaturated ester copolymer, olefin/unsaturated acid copolymer, and anhydride modified olefin polymers and copolymers, e.g., in which the anhydride is grafted onto the olefin polymer or copolymer. More particularly, polymers for use in tie layers include anhydride modified polyolefin, anhydride modified ethylene/alpha-olefin copolymer, ethylene/vinyl acetate copolymer, ethylene/butylacrylate copolymer, ethylene/methyl methacrylate copolymer, ethylene/acrylic acid copolymer, ethylene/methacrylic acid copolymer, and polyurethane. Modified polymers suitable for use as tie layers are described in U.S. Pat. No. 3,873,643, to Wu et al, entitled "Graft Copolymers of Polyolefins and Cyclic acid and acid anhydride monomers"; U.S. Pat. No. 4,087,587, to Shida, et al, entitled "Adhesive Blends"; and U.S. Pat. No. 4,394,485, to Adur, entitled "Four Component Adhesive Blends and Composite Structures", each of which are hereby incorporated, in their entirety, by reference thereto.

Preferred polymers for use in the tie layer include olefin polymers which are modified (e.g., grafted) with one or more monomers such as acrylic acid, methacrylic acid, fumaric acid, maleic acid, maleic anhydride, 4-methyl cyclohex-4-ene-1,2-dicarboxylic acid anhydride, bicyclo (2.2.2)oct-5-ene-2,3-dicarboxylic acid anhydride, 1,2,3,4,5, 8,9,10-octahydronaphthalene-2,3-dicarboxylic acid anhydride, 2-oxa-1,3-diketospiro(4.4)non-7-ene, bicyclo(2.2.1) hept-5-ene-2,3-dicarboxylic acid anhydride, maleopimaric acid, tetrahydrophthalic anhydride, x-methylbicyclo(2.2.1) hept-5-ene-2,3-dicarboxylic acid anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers, as known to those of skill in the art.

In the inflatable cellular cushioning article of the present invention, the tie layer provides a high level of adhesive and cohesive strength in order to prevent the multilayer film from delaminating when the article is inflated to an internal pressure of 3 psi under standard conditions (i.e., 25° C. and 1 atmosphere pressure), and thereafter subjected to harsh conditions, for example, 140° F. for 4 hours. It has been found that not just any tie layer polymer is capable of providing a level of adhesive and cohesive strength adequate to provide the 3 psi inflated article with the desired performance properties when subjected to harsh conditions.

More particularly, it has been found that a tie layer made of 100 percent anhydride grafted low density polyethylene having an anhydride content of 141 parts per million based on resin weight (as measured by pyrolysis GC-MS) did not exhibit a level of adhesive and/or cohesive strength to prevent the article, when inflated to 3 psi, from delaminating both adhesively and cohesively. However, a tie layer made of 100 percent anhydride grafted linear low density polyethylene having an anhydride content of 190 parts per million based on resin weight, provided adequate adhesive and cohesive strength to prevent delamination under harsh conditions. See Examples, below. Accordingly, it is believed that a tie layer made from an anhydride grafted polyolefin having anhydride content of at least 160 parts per million, based on resin weight, will provide a desired level of adhesive and cohesive strength to prevent film delamination in an inflated cellular cushioning article having an internal pressure of 3 psi, when the article is subjected to harsh conditions such as 140° F. for 4 hours, or a reduced external pressure of 0.542 atmospheres for 5 minutes. Preferably, the modified polyolefin is selected from modified LLDPE, modified LDPE, modified VLDPE, and modified homogeneous ethylene/alpha-olefin copolymer. Preferably, the polyolefin is anhydride modified, preferably having an anhydride content of at least 150 ppm, more preferably 155 ppm, more preferably 160 ppm more preferably 165 ppm more preferably 170 ppm more preferably 175 ppm more preferably 180 ppm more preferably 185 ppm more preferably 190 ppm, based on resin weight. Preferably, the modified polyolefin has an anhydride content of from 150 to 1000 ppm, more preferably from 160 to 500 ppm, more preferably from 165 to 300 ppm, more preferably from 170 to 250 ppm, more preferably from 175 to 220 ppm, more preferably from 180 to 210 ppm, more preferably from 185 to 200 ppm, based on resin weight.

Determination of Anhydride Content in Resins

Anhydride Content was determined for two tie layer resins used to make inflatable articles in the examples set forth below. The resins were Plexar® PX3236 anhydride modified linear low density polyethylene and Plexar® PX165 anhydride modified low density polyethylene, both obtained from Quantum chemical company. Pyrolysis gas chromatography-mass spectrometry (GC-MS) was employed for the quantitation of maleic anhydride in PX3236 and PX165 resins. Total maleic anhydride content was as follows:

| Resin Identity | Maleic Anhydride Content (ppm) |
|---|---|
| PX3236 | 190 |
| PX165 | 141 |

In the pyrolysis GC-MS analysis, for each resin, a 10 mg specimen was placed into a quartz tube and secured with silane treated glass wool. The quartz tube was inserted into a CDS Analytical Pyroprobe 2000 coil probe. The probe was placed into a heated interface (280° C.) and resin pyrolyzed at 700° C. for 10 seconds in an inert atmosphere. The volatiles from the resins were collected on a Tenax trap at 40 mL/min. After 10 seconds, the contents of the trap were thermally desorbed onto the GC-MS. Conditions were as shown below:

| Analysis Parameter | Description |
|---|---|
| Instrument | HP 5890 with HP5971A Mass Spectrometric Detector |
| Carrier | Helium at 0.6 mL/min, 10:1 split |
| Column | J&W DB-35 ms, 30 meters × 0.25 mm i.d., 0.25 µm film thickness |
| Injector Temperature | 250° C. |
| Temperature Program | 35° C. for 2 min, then ramp to 300° C. at 10° C./min and held for 5 min |
| Detector Temperature | 280° C. |
| Desorption Program | 40° C. to 250° C. at 40° C./min, 6 minute desorption time |
| Cryotrap | −120° C. for 6.5 minutes, then rapidly heated to 230° C. |
| Mass Spectrometer | Sim mode monitoring ions 54 and 98 for maleic anhydride at 100 msec dwell at each ion |

The concentration of maleic anhydride in the resins was determined by comparison of the results obtained with known standards of maleic anhydride in methanol which were analyzed along with the Plexar® resins.

If desired or necessary, various additives are also included with the films. For example, additives comprise pigments, colorants, fillers, antioxidants, flame retardants, anti-bacterial agents, anti-static agents, stabilizers, fragrances, odor masking agents, anti-blocking agents, slip agents, nucleating agents, and the like. Thus, the present invention encompasses employing suitable film constituents.

FIG. 3 illustrates a cross-sectional view of a preferred multilayer film for use as films 12 and 14 in FIGS. 1 and 2. Referring to FIG. 3, there is shown a cross-sectional view of film 12 having A/B/C/B/A structure, film 12 having a total thickness of 1.6 mils.

The A layers were each seal layers, and each make up 43 percent of the total thickness of the film. Each of the A layers were a blend of 45% by weight HCX002 linear low density polyethylene having a density of 0.941 g/cc and a melt index of 4, obtained from Mobil, 45% by weight LF10218 low density polyethylene having a density of 0.918 g/cc and a melt index of 2, obtained from Nova, and 10% by weight SLX9103 metallocene-catalyzed ethylene/alpha-olefin copolymer, obtained from Exxon.

The B layers were each tie layers, and each make up 2% of the total thickness of film 12. Each of the B layers were tie layers made of 100% Plexar® PX3236 anhydride modified linear low density polyethylene copolymer, obtained from Qunatum Chemical. A pyrolysis analysis of Plexar® PX3236 resulted in a determination of the presence of anhydride at a level of 190 ppm, based on resin weight.

The C layer was a gas barrier layer, and makes up 10% of the total thickness of film 12. The C layer was an $O_2$-barrier layer of 100% CAPRON® B100WP polyamide 6 having a viscosity of FAV=100, obtained from Allied Chemical.

FIG. 4 is a schematic of a particularly preferred apparatus and process 50 for making the inflatable cushioning article of the present invention. In FIG. 4, extruders 52 and 54 extrude first film 56 and second film 58, respectively, from slot dies, as shown. After extrusion, film 56 makes a partial wrap around heat transfer (cooling) roller 60, which preferably has a diameter of 8 inches and which is maintained at a surface temperature well beneath the fusion temperature of the extrudate, e.g., from 100–150° F. Second film 58 makes a partial wrap around each of heat transfer (cooling) rollers 62 and 64, each of which has a diameter of 8 inches and each of which is maintained at a surface temperature similar to that of cooling roller 60. After cooling, first film 56 makes a partial wrap (about 90 degrees) around Teflon® coated rubber nip roll 66, which has a diameter of 8 inches and which has, as its primary function, maintaining nip with heat transfer (heating) raised surface roll 70. While first film 56 is passing over nip roll 66, second film 58 merges with first film 56, with both films together being wrapped for a short distance around nip roll 66 before together entering first nip 68. Nip roller 66 provides a location of films 56 and 58 to come together without being marred or distorted.

Thereafter, second film 58 makes direct contact with raised surface roll 70 (which is illustrated as a smooth roll only for simplicity of illustration). First nip 68 subjects films 56 and 58 to a pressure of from 2 to 10 pounds per linear inch, preferably 2 to 6 pounds per linear inch, more preferably about 4 pounds per linear inch.

Films 56 and 58 together contact raised surface roll 70 for a distance of about 180 degrees. Raised surface roll 70 has a diameter of 12 inches, is heated by circulating hot oil therethrough so that the surface is maintained at a temperature of from 280° F. to 350° F., and has edges of the raised surfaces being rounded over to a radius of 1/64 inch. Raised surface roll 70 has a Teflon® polytetrafluoroethylene coating thereon, with the raised surfaces being above the background by a distance of 1/4 inch (0.64 cm). Moreover, the raised surface of raised surface roll 70 is provided with a surface roughness of from 50 to 500 root mean square (i.e., "rms"), preferably 100 to 300 rms, more preferably about 250 rms. This degree of roughness improves the release qualities of raised surface roll 70, enabling faster process speeds and a high quality product which is undamaged by licking back on roll 70.

The raised surface heats that portion of film 58 which contacts the raised surface of roll 70. Heat is transferred from raised surface roll 70, through a heated portion of film 58, to heat a corresponding portion of film 56 to be heat sealed to film 58. Upon passing about 180 degrees around raised surface roll 70, heated films 58 and 56 together pass through second nip 72, which subjects heated films 58 and 56 to about the same pressure as is exerted in first nip 68, resulting in a patterned heat seal between films 56 and 58.

After passing through second nip 72, films 58 and 56, now sealed together, pass about 90 degrees around heat transfer (cooling) roller 74, which has a diameter of 12 inches and which has cooling water passing therethrough, the cooling water having a temperature of from 100° F. to 150° F. Cooling roller 74 has a ¼ inch thick (about 0.64 cm thick) release and heat-transfer coating thereon. The coating is made from a composition designated "SA-B4", which is provided and applied to a metal roller by Silicone Products and Technologies Inc of Lancaster, N.Y. The coating contains silicone rubber to provide cooling roller 74 with a Shore A hardness of from 40 to 100, preferably 50–80, more preferably 50–70, and still more preferably about 60. The SA-B4 composition also contains one or more fillers to increase the heat conductivity to improve the ability of cooling roller 74 to cool the still hot films, now sealed together to result in inflatable article 10, which is thereafter rolled up to form a roll for shipment and subsequent inflation and sealing, to result in a cushioning article.

In order to carry out the process at relatively high speed, e.g., speeds of at least 120 feet per minute, preferably from 150 to 300 feet per minute, but up to as high as 500 feet per minute, it has been found to be important to provide the manufacturing apparatus with several features. First, the raised surface roll should be provided with a release coating or layer, and to also avoid sharp edges which interfere with a clean release of the film from the raised surface roll. As used herein, the phrase "release coating" is inclusive of all release coatings and layers, including polyinfused coatings, applied coatings such as brushed and sprayed coatings which cure on the roll, and even a release tape adhered to the roll. A preferred release coating composition is Teflon® polytetrafluoroethylene. Second, the edges of the raised surfaces should be rounded off to a radius large enough that the film readily releases without snagging on an edge due to its "sharpness" relative to the softened film. Preferably, the radius of curvature is from 1/256 inch to 3/8 inch, more preferably from 1/128 inch to 1/16 inch, more preferably from 1/100 inch to 1/32 inch, and more preferably about 1/64 inch, i.e., about 0.04 cm. It is also important to provide the cooling roller downstream of and in nip relationship with the raised surface roller, with a release coating or layer, as described above.

The cooling roller lowers the temperature of the selected heated portions of the laminate, in order to cool the heat seals so that they become strong enough to undergo further processing without being damaged or weakened. Moreover, the cooling means is preferably immediately downstream of the heating means (i.e., the raised surface roll), in order to reduce heat seepage from the still-hot seals to unheated portions of film, to prevent unheated portions of laminated article from becoming hot enough to fuse the films in an area intended to serve as an inflation chamber or inflation passageway.

Preferably, the films used to make the inflatable article are blown or cast films. Blown films, also referred to as hot blown films, are extruded upwardly from an annular die, and are oriented in the lengthwise and transverse directions while still molten, by blowing the annular extrudate into a bubble (transverse orientation) and drawing on the bubble at a faster rate that the rate of extrusion (machine direction orientation). However, a preferred method of making the film for use in the present invention is a cast extrusion process in which molten polymer is extruded through a slot die, with the extrudate contacting a chilled roll shortly after extrusion. Both hot blown films and cast films have a total free shrink (i.e., machine direction free shrink plus transverse free shrink) at 185° F. of less than 15 percent as measured by ASTM D 2732, more preferably, less than 10 percent.

The films from which the inflatable cellular cushioning article are made are thick enough to provide the inflatable article with adequate strength and durability, but thin enough to minimize the amount of resin necessary. If the maximum dimension of the cells is from 1 to 3 inches, preferably each of the films has a thickness of from 0.1 to 20 mils, more preferably, from 0.5 to 10 mils, more preferably from 0.5 to 4 mils, more preferably 0.5 to 3 mils, more preferably from 1 to 3 mils, more preferably, from 1 to 2 mils, and more preferably about 1.6 mils. As the films do not have an entirely uniform thickness, they can also be described as having a unit weight of from 20 to 70 grams/square meter, more preferably 25 to 65 gms/square meter, more preferably 30 to 60 gms/square meter, more preferably 30 to 50 gms/square meter, more preferably 30 to 45 gms/square meter, and more preferably about 38 grams/square meter.

EXAMPLE

An inflatable article in accordance with the present invention was prepared by extruding, cooling, heat sealing, cooling, and winding up two films in accordance with the process of FIG. 4, as described above. The resulting inflatable article was sealed in the pattern illustrated in FIG. 1, and aged for a temperature and time to ensure that the crystallinity of the polyamide 6 layer was substantially complete before testing was conducted. For example, crystallization of the polyamide 6 layer is substantially complete if the film is aged at 140° F. for at least 2 hours, or for at least 8 days at 72° F. Upon inflation, the article had an appearance in accordance with FIG. 2. The inflatable article had a lay flat (uninflated) width of 15.5 inches. Each chamber consisted of an inflation port and 7 cells in series, each cell being circular in shape and having a lay flat diameter of 1.75 inches before inflation. The channels between the cells had a lay flat width of 0.6 inches. Each of the films had an A/B/C/B/A structure as described in FIG. 3, and each of the films had a unit weight of 38 grams per square meter (i.e., a average thickness of about 1.6 mils). The layer arrangements, thicknesses, and compositions were as follows:

| Layer Identity | Thickness of Each Layer (% of Total Film Thickness) | Layer Composition |
| --- | --- | --- |
| A Seal layer (there were two of these) | 43 | Blend of 45 wt % HCX002 linear low density polyethylene, 45 wt. % LF10218 low density polyethylene, and 10% by weight SLX9103 metallocene-catalyzed ethylene/alpha-olefin copolymer |
| B Tie layer (there were two of these) | 2 | 100 wt. Percent Plexar® PX3236 anhydride modified linear low density polyethylene copolymer |

-continued

| Layer Identity | Thickness of Each Layer (% of Total Film Thickness) | Layer Composition |
|---|---|---|
| C Barrier layer (present as a single layer in the central position) | 10 | 100% CAPRON ® B100WP polyamide 6 |

Comparative Example

A comparative inflatable article was produced and aged in a manner in all respects identical to Example 1, with the only difference being that the B layers were each made from 100 weight percent Plexar® PX165 anhydride modified low density polyethylene. The comparative inflatable article was made on the same equipment, and under substantially the same conditions, as used to make the inflatable article of the example.

Performance Characteristics of Example vs. Comparative Example

Creep: 1 psi Inflation, 0.1 psi Load, Room Temperature

Samples measuring 10 inches by 10 inches of both the inflatable article of the Example and the inflatable article of the Comparative Example were inflated to 1 psi and sealed shut. Creep (i.e., loss of cell height) was measured at 25° C. by placing a load of 0.1 psi thereon for a period of 7 days. Both articles performed well. The Comparative Example exhibited a creep of 2 percent while the Example exhibited a creep of 2.2 percent. Neither inflated article exhibited delamination, seal failure, or film rupture.

Creep: 1 psi Inflation, 0.1 psi Load, 140° F.

Samples measuring 10 inches by 10 inches of both the inflatable article of the Example and the inflatable article of the Comparative Example were inflated to 1 psi and sealed shut. The creep test was conducted by placing the samples under a load of 0.1 psi and heating both samples to 140° F. for a period of 7 days. Both articles performed well. The Comparative Example exhibited a creep of 2.2 percent while the Example exhibited a creep of 2.1 percent. Neither inflated article exhibited delamination, seal failure, or film rupture.

Creep: 3 psi Inflation, 0.1 psi Load, Room Temperature

Samples measuring 10 inches by 10 inches of both the inflatable article of the Example and the inflatable article of the Comparative Example were inflated to 3 psi and sealed shut. The creep test was conducted by placing the samples under a load of 0.1 psi at room temperature for 7 days. Both articles performed well. The Comparative Example exhibited a creep of 2.6 percent while the Example exhibited a creep of 2.4 percent. Neither inflated article exhibited delamination, seal failure, or film rupture.

Creep: 3 psi Inflation, 0.1 psi Load, 140° F.

Samples measuring 10 inches by 10 inches of both the inflatable article of the Example and the inflatable article of the Comparative Example were inflated to 3 psi and sealed shut. The creep test was conducted by placing the samples under a load of 0.1 psi at 140° F. for 5 days. The Comparative Example exhibited a creep of 4.2 percent while the Example exhibited a creep of 4.4 percent. However, the Comparative Example exhibited substantial delamination, in that approximately 30 percent of the film became delaminated during the creep test.

High Altitude Test: 1 psi Inflation, 13.7 in Hg Vacuum, Room Temperature

Samples measuring 10 inches by 10 inches of both the inflatable article of the Example and the inflatable article of the Comparative Example were inflated to 1 psi and sealed shut. Each of the samples was then placed in an environment which had been evacuated to simulate an altitude of approximately 17,000 feet above sea level, i.e., subjected to 13.7 inches of vacuum, for a period of 5 minutes. Both articles performed well. Neither inflated article exhibited delamination, seal failure, or film rupture High Altitude Test: 3 psi Inflation, 13.7 in Hg Vacuum, Room Temperature Samples measuring 10 inches by 10 inches of both the inflatable article of the Example and the inflatable article of the Comparative Example were inflated to 3 psi and sealed shut. Each of the samples was then placed in an environment which had been evacuated to simulate an altitude of approximately 17,000 feet above sea level, i.e., subjected to 13.7 inches of vacuum, for a period of 5 minutes. While the article of the Example performed well, the Comparative Example failed the test in that from 40–70 percent of the chambers deflated due to the film bursting. The rupture of the Comparative Example was apparent upon removing the sample from the low pressure environment.

Burst Pressure Test

The Burst Pressure Test was carried out on a section of the inflatable article 80 which was modified with additional seal 82, as shown in FIG. 5. Seal 82 is a heat seal, and is made up of longitudinal heat seal portion 84 and transverse heat seal portion 86. Longitudinal seal portion 84 runs parallel to edge 33, and is spaced a desired distance from seal edges 88 to provide inflation passageway 87, so that inflation nozzle 90 (see FIGS. 6A, 6B, and 6C) can be inserted and fit snugly against the inside surface thereof. Inflation nozzle 90 has mirror-image passageways 92 and 94 therewithin, with one passageway being connected to a source of compressed air, while the other is connected to a pressure gauge. Passageways 92 and 94 each have a diameter of 3/32 inch. Inflation nozzle 90 is inserted into passageway 87 until inflation nozzle base portion 96 contacts film edge 89. Then clamp 100 (see FIG. 7) is placed over that portion of the film around passageway 87 which covers cylindrical portion 98 of inflation nozzle 90. Cylindrical portion 98 has a diameter of 3/8 inch.

Figure 7A:
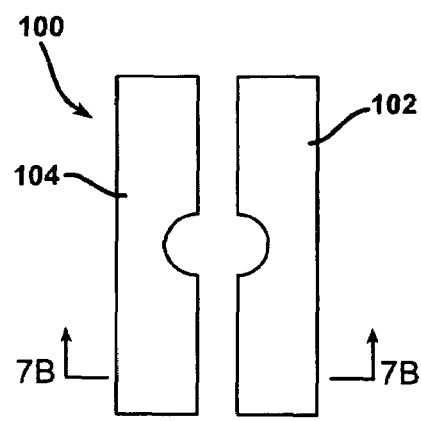
FIG. 7A is a longitudinal view of a pair of clamp cauls used to clamp the inflatable article to the inflation nozzle of FIGS. 6A, 6B, and 6C.
Figure 7B:
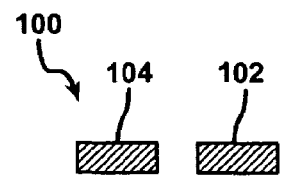
FIG. 7B is a cross-sectional view of the clamping cauls of FIG. 7A, taken through line 7B—7B of FIG. 7A.
Figure 8A:
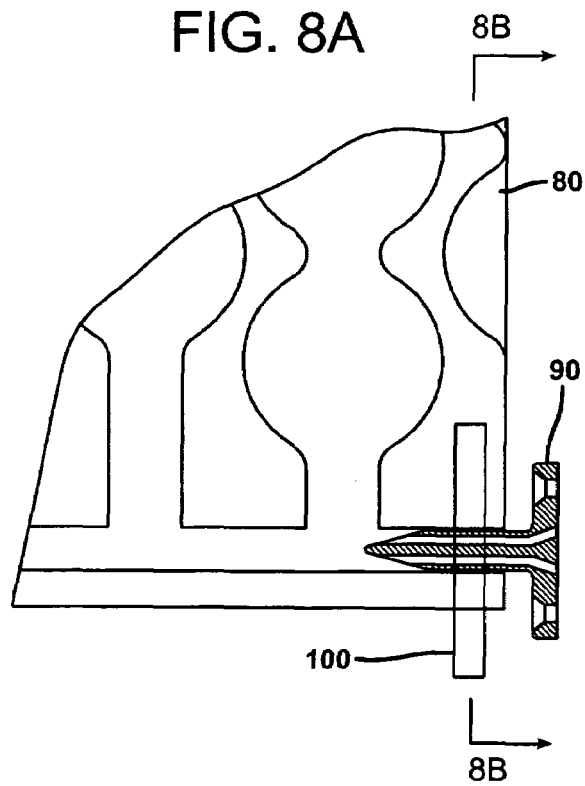
FIG. 8A is a detail view of an assembly which includes that portion of the modified inflatable article which contains the inflation nozzle and the clamping cauls.
Figure 8B:
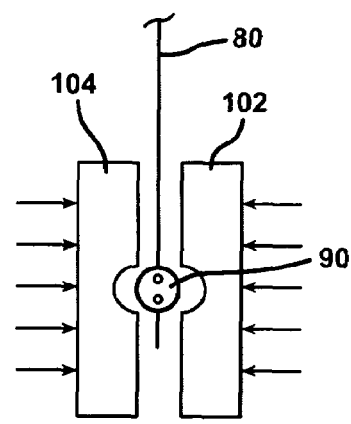
FIG. 8B is a schematic cross-sectional view of the assembly of FIG. 8A.

As shown in FIGS. 7A and 7B, clamp cauls 100, which comprise upper clamp caul 102 and lower clamp caul 104, are used to hold the films of inflatable article 80 firmly against inflation nozzle 90, in the position illustrated in FIGS. 8A and 8B. The device for applying force to hold clamping cauls 100 firmly against inflation nozzle 90 is not illustrated, but can be any means known to those of skill in the art, such as a C-clamp, bar clamp, spring clamp, hydraulic clamp, etc. When forced firmly against film 80 as illustrated in FIGS. 8A and 8B, clamping cauls 100 reduce or eliminate backflow of compressed air past inflation nozzle 90 and out of passageway 87. It should be noted that transverse seal portion 86 serves to provide a closed end to passageway 87, so that upon addition of compressed air from inflation nozzle 90, eleven chambers were simultaneously inflated until the article burst.

During the Burst Pressure Test, compressed air was provided to the inflation nozzle at 20 psi, using a pressure regulator, with airflow being controlled by a throttling device (e.g., orifice, needle valve, etc) to 0.2 standard cubic feet per minute at free flow. The test was carried out while the inflatable article was at 23° C. and while the ambient pressure surrounding the inflatable article was 1 atmosphere.

When the inflatable article ruptured, the peak pressure was recorded. The inflatable article of the Example reached a pressure of about 8 to 9 psi before bursting. In contrast, the inflatable article of the Comparative Example reached a pressure of from about 5 to 6 psi before bursting.

A Second Example of the inflatable article according to the present invention was prepared. The films from which the Second Example was made were the same as for the Example above. The difference between the Example and the Second Example was in the seal pattern. While the seal pattern for the Example was substantially as illustrated in FIG. 1, the seal pattern for the Second Example was altered to be similar to the seal pattern illustrated in FIG. 1 of U.S. Pat. No. 4,096,306, to C. L. Larson, entitled "STRIP MATERIAL USED IN FORMING AIR INFLATED CUSHIONING MATERIAL", which is hereby incorporated, in its entirety, by reference thereto.

More particularly, although the chambers extended transversely across the article, instead of seals being shaped so that the channels between the cells were bounded by a curved seal edge, the edges of the seals were shaped to have corners, i.e., sharp bends which are effectively inflection points, with the seals being shaped to form round cells connected by linear channels of uniform width. In other words, the channels between the cells intersected the cells at corners which were sharp bends. It is believed that such sharp corners are capable of concentrating stresses when the article is inflated. Of course, the higher the inflation pressure, the greater the stress concentrations at the sharp bends. In the Second Example, the cells were round and had a lay-flat diameter of 1.25 inches, and the connecting channels had a uniform width. The width varied with the several chambers which were formed. Some chambers had connecting channels having a width of 0.25 inch; other cells chambers had connecting channels having a width of 0.3125 inch; yet other chambers had connecting channels having a width of 0.375, and still other chambers had connecting channels having a width of 0.5 inches.

Upon inflating the cells of the Second Example to 3 psi internal pressure (of course, after aging the inflatable article until crystallization of the polyamide 6 was substantially complete), the sharp corners formed by the seal shape did not result in layer delamination, seal failure, film rupture, or any other detrimental result. In fact, when inflated to 3 psi internal pressure followed by being subjected to a high altitude test, the vacuum could be raised to 24 inches of mercury before failure occurred. Moreover, the rupture was not associated with the stress concentration at one of the sharp corners.

When subjected to a Burst Pressure test, the inflatable article (again, of course, aged until crystallization of the polyamide 6 layer was substantially complete) of the Second Example could be inflated to 12.5 psi before bursting. Again, when the article of the Second Example failed, it was via film rupture, and the rupture was not associated with the stress concentration at one of the sharp corners.

A corresponding Third Example was made with 1.25 inch diameter cells but with the seals being formed in the curved shape illustrated in FIG. 1, with the connecting channels having curved edges as illustrated in FIG. 1, the channel having a minimum width of 0.5 inches. The article of the Third Example exhibited a performance equivalent to the corresponding Second Example in both the High Altitude Test and the Burst Pressure Test, again indicating that the presence of seal edges having sharp corners had no significant effect on the performance of the inflatable article. The article failed by film rupture, rather than film delamination or seal failure. It appears that the presence of the stronger tie layer contributes to this result.

The results of the various tests reported above demonstrate that the inflatable article according to the Example provides improved performance over the article of the Comparative Example. When inflated to a higher internal pressure, the article according to the Example could withstand higher temperatures and/or higher altitudes, without delamination, seal failure, or film bursting. However, the results of the less harsh tests show why the improvement in the article of the Example was not readily apparent. The Comparative Article had to be not only inflated to the higher pressure of 3 psi, it also had to be subjected to elevated temperature or high altitude pressure conditions, in order for the superiority of the article of the Example to be apparent.

In the figures and specification, there have been disclosed preferred embodiments of the invention. All sub-ranges of all ranges disclosed are included in the invention and are hereby expressly disclosed. Those skilled in the art will appreciate that numerous changes and modifications may be made to the embodiments described herein, and that such changes and modifications may be made without departing from the spirit of the invention.

What is claimed is:

1. An inflatable cellular cushioning article having a plurality of inflatable chambers with each chamber comprising a plurality of inflatable cells connected in series with one another, the article being made from a first multilayer film having a unit weight of from 20 to 250 grams per square meter sealed to itself or a second film having a unit weight of from 20 to 250 grams per square meter, wherein the first and second films each comprise an outer seal layer, a gas barrier layer, and a tie layer between the seal layer and the gas barrier layer, with the tie layer comprising an anhydride modified olefin polymer containing anhydride at a level of at least 150 ppm, based on the weight of the modified olefin polymer, wherein the gas barrier layer consists essentially of at least one barrier polymer selected from the group consisting of polyamide, hydrolyzed ethylene/vinyl acetate copolymer, polyacrylonitrile, and polycycloolefin, with the at least one barrier polymer comprising polymer which crystallizes upon aging and the inflatable cellular cushioning product has been aged for a temperature and time to ensure that the crystallinity of the polymer in the in the gas barrier layer is substantially complete.

2. An inflatable cellular cushioning article having a plurality of inflatable chambers with each chamber comprising a plurality of inflatable cells connected in series with one another, the inflatable cells having a maximum lay flat dimension of from 1 to 3 inches, the article being made from a first multilayer film having a unit weight of from 20 to 70 grams per square meter sealed to itself or a second multilayer film having a unit weight of from 20 to 70 grams per square meter, wherein the first and second films each comprise an outer seal layer, a gas barrier layer, and a tie layer between the seal layer and the gas barrier layer, the article exhibiting a failure pressure of at least 7 psi, wherein the gas barrier layer consists essentially of at least one barrier polymer selected from the group consisting of polyamide, hydrolyzed ethylene/vinyl acetate copolymer, polyacrylonitrile, and polycycloolefin, with the at least one barrier polymer comprising polymer which crystallizes upon aging and the inflatable cellular cushioning product has been aged for a temperature and time to ensure that the crystallinity of the polymer in the in the gas barrier layer is substantially complete.

3. An inflatable cellular cushioning article having a plurality of inflatable chambers with each chamber comprising a plurality of inflatable cells connected in series with one another, the inflatable cells having a maximum lay flat dimension of from 3 inches to 6 inches, the article being made from a first multilayer film having a unit weight of from 60 to 250 grams per square meter sealed to itself or a second multilayer film having a unit weight of from 60 to 250 grams per square meter, wherein the first and second films each comprise an outer seal layer, a gas barrier layer, and a tie layer between the seal layer and the gas barrier layer, the article exhibiting a failure pressure of at least 7 psi, wherein the gas barrier layer consists essentially of at least one barrier polymer selected from the group consisting of polyamide, hydrolyzed ethylene/vinyl acetate copolymer, polyacrylonitrile, and polycycloolefin, with the at least one barrier polymer comprising polymer which crystallizes upon aging and the inflatable cellular cushioning product has been aged for a temperature and time to ensure that the crystallinity of the polymer in the in the gas barrier layer is substantially complete.

4. An inflatable cellular cushioning article having a plurality of inflatable chambers with each chamber comprising a plurality of inflatable cells connected in series with one another, the inflatable cells having a maximum dimension of from 1 to 3 inches, the article being made from a first multilayer film having a unit weight of from 20 to 70 grams per square meter sealed to itself or a second multilayer film having a unit weight of from 20 to 70 grams per square meter, wherein the first and second films each comprise an outer seal layer, a gas barrier layer, and a tie layer between the seal layer and the gas barrier layer, the article being capable of withstanding inflation to an internal pressure of 3 psi measured at 23° C. and 1 atmosphere ambient pressure with the resulting inflated article being subjected to a reduced ambient pressure of 0.542 atmosphere for a period of 5 minutes at a temperature of 23° C., without film failure, seal failure, or delamination of film layers from one another, wherein the gas barrier layer a consists essentially of at least one barrier polymer selected from the group consisting of polyamide, hydrolyzed ethylene/vinyl acetate copolymer, polyacrylonitrile, and polycycloolefin, with the at least one barrier polymer comprising polymer which crystallizes upon aging and the inflatable cellular cushioning product has been aged for a temperature and time to ensure that the crystallinity of the polymer in the in the gas barrier layer is substantially complete.

5. An inflatable cellular cushioning article having a plurality of inflatable chambers with each chamber comprising a plurality of inflatable cells connected in series with one another, the inflatable cells having a maximum dimension of from 3 inches to 6 inches, the article being made from a first multilayer film having a unit weight of from 60 to 250 grams per square meter sealed to itself or a second multilayer film having a unit weight of from 60 to 250 grams per square meter, wherein the first and second films each comprise an outer seal layer, a gas barrier layer, and a tie layer between the seal layer and the gas barrier layer, the article being capable of withstanding inflation to an internal pressure of 3 psi measured at 23° C. and 1 atmosphere ambient pressure with the resulting inflated article being subjected to a reduced ambient pressure of 0.542 atmosphere for a period of 5 minutes at a temperature of 23° C., without film failure, seal failure, or delamination of film layers from one another wherein the gas barrier layer consists essentially of at least one barrier polymer selected from the group consisting of polyamide, hydrolyzed ethylene/vinyl acetate copolymer, polyacrylonitrile, and polycycloolefin, with the at least one barrier polymer comprising polymer which crystallizes upon aging and the inflatable cellular cushioning product has been aged for a temperature and time to ensure that the crystallinity of the polymer in the in the gas barrier layer is substantially complete.

6. An inflatable cellular cushioning article having a plurality of inflatable chambers with each chamber comprising a plurality of inflatable cells connected in series with one another, the inflatable cells having a maximum dimension of from 1 to 3 inches, the article being made from a first multilayer film having a unit weight of from 20 to 70 grams per square meter sealed to itself or a second multilayer film having a unit weight of from 20 to 70 grams per square meter, wherein the first and second films are multilayer films each having a seal layer, a gas barrier layer, and a tie layer between the seal layer and the gas barrier layer, the article being capable of withstanding inflation to an internal pressure of 3 psi measured at 23° C. and 1 atmosphere ambient pressure with the resulting inflated article being subjected a load of 0.1 psi for a period of 7 days at a temperature of 140° F., without film failure, seal failure, or delamination of film layers from one another, wherein the gas barrier layer consists essentially of at least one barrier polymer selected from the group consisting of polyamide, hydrolyzed ethylene/vinyl acetate copolymer, polyacrylonitrile, and polycycloolefin, with at least one barrier polymer comprising polymer which crystallizes upon aging and the inflatable cellular cushioning product has been aged for a temperature and time to ensure that the crystallinity of the polymer in the in the gas barrier layer is substantially complete.

7. An inflatable cellular cushioning article having a plurality of inflatable chambers with each chamber comprising a plurality of inflatable cells connected in series with one another, the inflatable cells having a maximum dimension of from 3 inches to 6 inches, the article being made from a first multilayer film having a unit weight of from 60 to 250 grams per square meter sealed to itself or a second multilayer film having a unit weight of from 60 to 250 grams per square meter, wherein the first and second films are multilayer films each having a seal layer, a gas barrier layer, and a tie layer between the seal layer and the gas barrier layer, the article being capable of withstanding inflation to an internal pressure of 3 psi measured at 23° C. and 1 atmosphere ambient pressure with the resulting inflated article being subjected a load of 0.1 psi for a period of 7 days at a temperature of 140° F., without film failure, seal failure, or delamination of film layers from one another, wherein the gas barrier layer consists essentially of at least one barrier polymer selected from the group consisting of polyamide, hydrolyzed ethylene/vinyl acetate copolymer, polyacrylonitrile, and polycycloolefin, with at least one barrier polymer comprising polymer which crystallizes upon aging and the inflatable cellular cushioning product has been aged for a temperature and time to ensure that the crystallinity of the polymer in the in the gas barrier layer is substantially complete.

8. An inflatable cellular cushioning article having a plurality of inflatable chambers with each chamber comprising a plurality of inflatable cells connected in series with one another, the inflatable cells having a maximum dimension of from 1 to 3 inches, the article being made from a first multilayer film having a unit weight of from 20 to 70 grams per square meter sealed to itself or a second multilayer film having a unit weight of from 20 to 70 grams per square meter, wherein the first and second films each comprise an outer seal layer, a gas barrier layer, and a tie layer between the seal layer and the gas barrier layer, the article being capable of withstanding an internal inflation pressure of 3 psi, measured at 23° C. and 1 atmosphere ambient pressure, for a period of 4 hours at a temperature of 140° F., without film failure, seal failure, or delamination of film layers from one another, wherein the gas barrier layer consists essentially of at least one barrier polymer selected from the group consisting of polyamide, hydrolyzed ethylene/vinyl acetate copolymer, polyacrylonitrile, and polycycloolefin, with the at least one barrier polymer comprising polymer which crystallizes upon aging and the inflatable cellular cushioning product has been aged for a temperature and time to ensure that the crystallinity of the polymer in the in the gas barrier layer is substantially complete.

9. An inflatable cellular cushioning article having a plurality of inflatable chambers with each chamber comprising a plurality of inflatable cells connected in series with one another, the inflatable cells having a maximum dimension of from 3 to 6 inches, the article being made from a first multilayer film having a unit weight of from 60 to 250 grams per square meter sealed to itself or a second multilayer film having a unit weight of from 60 to 250 grams per square meter, wherein the first and second films each comprise an outer seal layer, a gas barrier layer, and a tie layer between the seal layer and the gas barrier layer, the article being capable of withstanding an internal inflation pressure of 3 psi, measured at 23° C. and 1 atmosphere ambient pressure, for a period of 4 hours at a temperature of 140° F., without film failure, seal failure, or delamination of film layers from one another, wherein the gas barrier layer consists essentially of at least one barrier polymer selected from the group consisting of polyamide, hydrolyzed ethylene/vinyl acetate copolymer, polyacrylonitrile, and polycycloolefin, with at least one barrier polymer comprising polymer which crystallizes upon aging and the inflatable cellular cushioning product has been aged for a temperature and time to ensure that the crystallinity of the polymer in the in the gas barrier layer is substantially complete.

10. The inflatable cellular cushioning article according to claim 1, wherein the tie layer comprises an anhydride modified ethylene/$C_{4-10}$ alpha-olefin copolymer.

11. The inflatable cellular cushioning article according to claim 1, wherein the seal layer of the first and second films comprises at least one member selected from the group consisting of homogeneous ethylene/alpha-olefin copolymer, very low density polyethylene, low density polyethylene, and linear low density polyethylene.

12. The inflatable cellular cushioning article according to claim 1, wherein the first film has first and second outer layers, a central gas barrier layer, a first tie layer between the first outer layer and the gas barrier layer, and a second tie layer between the gas barrier layer and the second outer layer.

13. The inflatable cellular cushioning article according to claim 12, wherein the first and second outer layers of the first film have the same layer thickness and have the same polymeric composition, and the first and second tie layers of the first film have the same layer thickness and the same polymeric composition.

14. The inflatable cellular cushioning article according to claim 1, wherein the article comprises the first film heat sealed to the second film.

15. The inflatable cellular cushioning article according to claim 14, wherein:
the first film has first and second outer layers, a central gas barrier layer, a first tie layer between the first outer layer and the gas barrier layer, and a second tie layer between the gas barrier layer and the second outer layer; and
the second film has an first and second outer layers, a central gas barrier layer, a first tie layer between the first outer layer and the gas barrier layer, and a second tie layer between the gas barrier layer and the second outer layer.

16. The inflatable cellular cushioning article according to claim 15, wherein
the first and second outer layers of the first film have the same layer thickness and have the same polymeric composition, and the first and second tie layers of the first film have the same layer thickness and the same polymeric composition; and
the first and second outer layers of the second film have the same layer thickness and have the same polymeric composition, and the first and second tie layers of the second film have the same layer thickness and the same polymeric composition.

17. The inflatable cellular cushioning article according to claim 1, wherein the first film has a thickness of from 1 mil to 2 mils and the second film has a thickness of from 1 mils to 2 mils.

18. The inflatable cellular cushioning article according to claim 1, wherein the tie layer comprises anhydride modified polyolefin.

19. The inflatable cellular cushioning article according to claim 1, wherein the tie layer comprises an anhydride modified ethylene/$C_{4-8}$ copolymer having an anhydride content of at least 160 ppm as determined by pyrolysis GCMS.

20. The inflatable cellular cushioning article according to claim 19, wherein the anhydride modified polyolefin comprises anhydride modified linear low density polyethylene having an anhydride content of at least 180 ppm as determined by pyrolysis GCMS.

21. The inflatable cellular cushioning article according to claim 1, wherein the chambers extend transversely from an closed inflation manifold which extends along a machine direction.

22. The inflatable cellular cushioning article according to claim 1, wherein the chambers extend transversely from an open skirt which extends along a machine direction.

23. The inflatable cellular cushioning article according to claim 1, wherein each chamber comprises from 3 to 40 cells.

24. The inflatable cellular cushioning article according to claim 1, wherein the cells have a major uninflated axis which has a length of from 0.5 inch to 2.5 inches.

25. An inflatable cellular cushioning article having a plurality of inflatable chambers with each chamber comprising a plurality of inflatable cells connected in series with one another, the article being made from a first multilayer film having a unit weight of from 20 to 250 grams per square meter sealed to itself or a second film having a unit weight of from 20 to 250 grams per square meter, wherein the first and second films each comprise an outer seal layer, a gas barrier layer, and a tie layer between the seal layer and the gas barrier layer, with the tie layer comprising an anhydride modified olefin polymer containing anhydride at a level of from 150 to 1000 ppm, based on the weight of the modified olefin polymer, wherein the gas barrier layer comprises a polymer which crystallizes upon aging and the inflatable cellular cushioning product has been aged for a temperature and time to ensure that the crystallinity of the polymer in the in the gas barrier layer is substantially complete.

\* \* \* \* \*